United States Patent
Kim et al.

(10) Patent No.: US 12,018,181 B2
(45) Date of Patent: Jun. 25, 2024

(54) ADHESIVE COATING COMPOSITION FOR ELECTRICAL STEEL SHEET, ELECTRICAL STEEL SHEET LAMINATE AND METHOD FOR MANUFACTURING ELECTRICAL STEEL SHEET PRODUCT

(71) Applicant: POSCO, Pohang-si (KR)

(72) Inventors: Jung-Woo Kim, Pohang-si (KR); Bongwoo Ha, Pohang-si (KR); Taeyoung No, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 709 days.

(21) Appl. No.: 16/958,194

(22) PCT Filed: Dec. 17, 2018

(86) PCT No.: PCT/KR2018/016043
§ 371 (c)(1),
(2) Date: Jun. 26, 2020

(87) PCT Pub. No.: WO2019/132365
PCT Pub. Date: Jul. 4, 2019

(65) Prior Publication Data
US 2021/0071047 A1 Mar. 11, 2021

(30) Foreign Application Priority Data
Dec. 26, 2017 (KR) .................. 10-2017-0179925

(51) Int. Cl.
| | |
|---|---|
| *C09J 11/04* | (2006.01) |
| *B32B 7/12* | (2006.01) |
| *B32B 15/01* | (2006.01) |
| *B32B 37/12* | (2006.01) |
| *C09J 11/06* | (2006.01) |
| *C09J 123/06* | (2006.01) |
| *C09J 125/06* | (2006.01) |
| *C09J 133/08* | (2006.01) |
| *C09J 163/00* | (2006.01) |
| *C09J 175/04* | (2006.01) |
| *C09J 183/04* | (2006.01) |

(52) U.S. Cl.
CPC ............ *C09J 11/04* (2013.01); *B32B 7/12* (2013.01); *B32B 15/011* (2013.01); *B32B 37/12* (2013.01); *C09J 11/06* (2013.01); *C09J 123/06* (2013.01); *C09J 125/06* (2013.01); *C09J 133/08* (2013.01); *C09J 163/00* (2013.01); *C09J 175/04* (2013.01); *C09J 183/04* (2013.01)

(58) Field of Classification Search
None
See application file for complete search history.

(56) References Cited

U.S. PATENT DOCUMENTS

| | | | | |
|---|---|---|---|---|
| 2013/0252017 A1* | 9/2013 | Nakajima | ............... | C22C 21/10 148/533 |
| 2019/0010567 A1* | 1/2019 | Kim | ................... | C08K 3/32 |

FOREIGN PATENT DOCUMENTS

| | | |
|---|---|---|
| CN | 101659799 A | 3/2010 |
| CN | 105765106 A | 7/2016 |
| JP | 2005-240125 A | 9/2005 |
| JP | 2005240125 A * | 9/2005 |
| JP | 4571838 B2 | 10/2010 |
| JP | 2012-001807 A | 1/2012 |
| JP | 2012001807 A * | 1/2012 |
| JP | 2012-117103 A | 6/2012 |
| JP | 5830833 B2 | 11/2015 |
| JP | 2016-009710 A | 1/2016 |
| JP | 2016-540901 A | 12/2016 |
| JP | 2019-508573 A | 3/2019 |
| JP | 2021-510181 A | 4/2021 |
| KR | 10-1999-0026911 A | 4/1999 |
| KR | 10-0886236 B1 | 3/2009 |
| KR | 10-2013-0076642 A | 7/2013 |
| KR | 10-2017-0074110 A | 6/2017 |
| KR | 10-2017-0075527 A | 7/2017 |
| KR | 10-2017-0107568 A | 9/2017 |
| KR | 10-2019-0110097 A | 9/2019 |
| WO | 2006/043612 A1 | 4/2006 |

(Continued)

OTHER PUBLICATIONS

Titanate and aluminate Coupling agent PLENACT, Ajinomoto Fine-Techno Co., Inc. printed Apr. 11, 2023.*
Japanese Office Action dated May 11, 2021 issued in Japanese Patent Application No. 2020-536091.
International Search Report dated Apr. 3, 2019, issued in International Patent Application No. PCT/KR2018/016043.
Chinese Office Action dated Jan. 25, 2021 issued in Chinese Patent Application No. 201880084899.6.
Extended European Search Report dated Jan. 26, 2021 issued in European Patent Application No. 18893600.9.

(Continued)

*Primary Examiner* — Eli D. Strah
(74) *Attorney, Agent, or Firm* — Morgan, Lewis & Bockius LLP

(57) ABSTRACT

An exemplary embodiment of the present invention provides: an adhesive coating composition enabling adherence (coupling) of an electrical steel sheet without using conventional coupling methods such as welding, clamping, and interlocking; an electrical steel sheet laminate to which the same is applied; and a method for manufacturing the same. An adhesive coating composition for an electrical steel sheet, according to an exemplary embodiment of the present invention, includes, on the basis of 100 wt % of total solids: 15 to 70 wt % of a first composition containing an organic resin and an organic/inorganic composite in which inorganic nanoparticles are substituted for an organic resin; 20 to 80 wt % of a second composition containing a metal phosphate and phosphoric acid; and 1 to 10 wt % of a coupling agent. The coupling agent may contain one or more of a silane-based coupling agent, a titanate-based coupling agent, and an aluminate-based coupling agent.

16 Claims, No Drawings

(56) References Cited

FOREIGN PATENT DOCUMENTS

| WO | 2017/111244 A8 | 6/2017 | |
|---|---|---|---|
| WO | WO-2017111244 A1 * | 6/2017 | ............. B32B 15/04 |
| WO | 2018/117670 A3 | 6/2018 | |

OTHER PUBLICATIONS

Database WPO Week 201243, Jun. 21, 2012, XP002801614.
Database WPO Week 200615, Sep. 8, 2005, XP002801615.
European Communication dated Mar. 14, 2024 issued in European Patent Application No. 18893600.9.

* cited by examiner

ADHESIVE COATING COMPOSITION FOR ELECTRICAL STEEL SHEET, ELECTRICAL STEEL SHEET LAMINATE AND METHOD FOR MANUFACTURING ELECTRICAL STEEL SHEET PRODUCT

CROSS-REFERENCE OF RELATED APPLICATIONS

This application is the U.S. National Phase under 35 U.S.C. § 371 of International Patent Application No. PCT/KR2018/016043, filed on Dec. 17, 2018, which in turn claims the benefit of Korean Application No. 10-2017-0179925, filed on Dec. 26, 2017, the entire disclosures of which applications are incorporated by reference herein.

TECHNICAL FIELD

The present invention relates to an electrical steel sheet adhesive coating composition, and an electrical steel sheet laminate, and a method for manufacturing an electrical steel sheet product. In particular, it relates to an electrical steel sheet adhesive coating composition that can improve adherence between electrical steel sheets by controlling components of an electrical steel sheet coating composition and components of an adhesive layer formed between electrical steel sheets, an electrical steel sheet adhesive coating composition, and a method for manufacturing an electrical steel sheet product.

BACKGROUND ART

A non-oriented electrical steel sheet is a steel sheet of which a magnetic property thereof is uniform in all directions on a rolling plate, and has been widely used in a motor, and as an iron core of an electric generator, an electric motor, a small transformer, and the like.

The electrical steel sheet can be classified into two types such as one in which stress relief annealing (SRA) for improving the magnetic property after punching work should be practiced and another in which the SRA is omitted when cost loss is larger than the effect of the magnetic property by the SRA.

An insulating film is a film coated in a finishing process for manufacturing a product such as a motor, a generator iron core, an electric motor, a small-sized transformer, and the like, and requires an electrical characteristic that suppresses occurrence of an eddy current. In addition, continuous punching workability, stickiness resistance, and surface close contacting properties are required. The continuous punching workability means the ability of suppressing abrasion of a mold when preparing iron cores by laminating many materials after the punching work in a predetermined shape. The stickiness resistance means the ability to not stick between steel cores after a stress relief annealing process that restores the magnetic characteristic by removing the processing stress of the steel sheet.

In addition to the basic characteristics, excellent application workability of a coating solution, solution stability usable for a long period after the combination, and the like, are also required. Such an insulating film can be manufactured as an electrical steel sheet product by only using separate fastening methods such as welding, clamping, and interlocking.

Meanwhile, there have been attempts to fasten by thermal welding of an adhesive solution applied to an electrical steel sheet surface without using conventional fastening methods such as welding, clamping, interlocking, and the like. A main component of adhesive coating developed for this purpose is formed of organic materials.

However, since the organic adhesive coating composition undergoes a stress relief annealing process, the organic material decomposes at a high temperature and thus the surface characteristic (insulation, adhesion, corrosion resistance, and the like) is deteriorated and the adherence (fastening force) between each electrical steel sheet is almost lost.

In addition, an existing insulating coating film composition formed of a thermoplastic resin and a low melting point inorganic component is known. As a low melting point inorganic component, a low melting point glass frit, water glass, or colloidal silica is exemplified. However, the low-melting point glass frit and water glass not only have poor compatibility with thermoplastic resins, but also have a problem in that the bonding force is rapidly deteriorated due to decomposition of the resin after the stress relief annealing treatment process.

DISCLOSURE

Technical Problem

Exemplary embodiments of the present invention provide an adhesive coating composition that can bond electrical steel sheets without using a conventional fastening method such as welding, clamping, interlocking, and the like, an electrical steel sheet laminate using the same, and a manufacturing method of an electrical steel sheet laminate.

In exemplary embodiments of the present invention, an adhesive coating composition that can maintain the bonding force even after a stress relief annealing process, an electrical steel sheet laminate using the same, and a manufacturing method of an electrical steel sheet laminate.

Technical Solution

An electrical steel sheet adhesive coating composition according to an exemplary embodiment of the present invention includes, on the basis of 100 wt % of total solids: 15 to 70 wt % of a first composition containing an organic resin and an organic/inorganic composite in which inorganic nanoparticles are substituted for an organic resin; 20 to 80 wt % of a second composition containing a metal phosphate and phosphoric acid; and 1 to 10 wt % of a coupling agent.

The coupling agent may contain at least one of a silane coupling agent, a titanate coupling agent, and an aluminate coupling agent.

The silane coupling agent may include at least one of dimethyldichlorosilane, methyldichlorosilane, methyltrichlorosilane, phenyltrichlorosilane, trichlorosilane, trimethylchlorosilane, silicon tetrachloride, and vinyl trichlorosilane.

The titanate-based coupling agent may include at least one titanium trisostearate isopropoxide isopropyl tri(dioctyl phosphite) titanate, isopropyl trioryl titanate, titanium tris(dodecylbenzenesulfonate) isopropoxide, Isopropyl tri(dioctyl pyrophosphate) titanate, di(dioctyl pyrophosphate) ethylene titanate, and tetraisopropyl di(dioctyl phosphite) titanate.

The aluminate-based coupling agent may include at least one of an aluminum-titanium complex, bis(ethyl aceto acetate) aluminum diisopropyl, bis(acetyl acetoate) aluminum diisopropyl, an aluminum acetate coupling agent, isopropyl ester stearoyloxy aluminum, and isopropyl ester stearoyloxy aluminum.

The organic resin may include at least one selected from benzene, toluene, xylene, naphthalene, anthracene, and benzopyrene as a functional group.

The organic resin may include at least one selected from an epoxy resin, an ester resin, an acryl-based resin, a styrene resin, a urethane-based resin, and an ethylene resin.

The organic resin may have a weight-average molecular weight of 1000 to 100,000 and a solid fraction of 10 to 50 wt %.

The inorganic nanoparticles may include at least one of $SiO_2$, $Al_2O_3$, $TiO_2$, MgO, ZnO, CaO, and $ZrO_2$.

The inorganic nanoparticles may be substituted in an amount of 5 to 60 wt % in the organic/inorganic compound.

The metal phosphate includes at least one of aluminum phosphate monobasic $(Al(H_3PO_4)_3)$, cobalt phosphate monobasic $(Co(H_3PO_4)_2)$, calcium phosphate monobasic $(Ca(H_3PO_4)_2)$, zinc phosphate monobasic $(Zn(H_3PO_4)_2)$, magnesium phosphate monobasic $(Mg(H_3PO_4)_2)$.

An electrical steel sheet laminate according to an exemplary embodiment of the present invention includes: a plurality of electrical steel sheets; and a thermally-bonded layer that is disposed between the plurality of electrical steel sheets, wherein the thermally-bonded layer includes 15 to 70 wt % of a first composition containing an organic resin and an organic/inorganic composite in which inorganic nanoparticles are substituted for an organic resin, 15 to 70 wt % of a first composition containing an organic resin and an organic/inorganic composite in which inorganic nanoparticles are substituted for an organic resin, and 1 to 10 wt % of a coupling agent.

The coupling agent may contain at least one of a silane coupling agent, a titanate coupling agent, and an aluminate coupling agent.

A manufacturing method of an electrical steel sheet product according to an exemplary embodiment of the present invention includes: preparing a adhesive coating composition; coating the adhesive coating composition on a surface of an electrical steel sheet and then curing the same to form an adhesive coating layer; laminating a plurality of electrical steel sheets where the adhesive coating layer is formed, and thermally bonding the same to form a thermally-bonded layer; and forming an adhesive layer by performing stress relief annealing on a thermally-bonded electrical steel sheet laminate.

The forming of the adhesive coating layer may be carried out in a temperature range of 200 to 600° C.

The forming of the thermally-bonded layer may include thermal bonding under conditions of a temperature of 150 to 300° C. and a pressure of 0.5 to 5.0 MPa for 0.1 to 120 minutes.

The forming the thermally-bonded layer may include a temperature increase step and a bonding step, and the temperature increase rate of the temperature increase step may be 10° C./min to 1000° C./min.

The forming of the adhesive layer may be carried out at a temperature of 500 to 900° C. for 30 to 180 minutes.

The forming of the adhesive layer may be carried out in a denatured gas or nitrogen $N_2$ gas atmosphere.

The forming of the adhesive layer may be carried out in a denatured gas atmosphere that includes a gas containing 10 to 30 vol % of liquefied natural gas (LNG) and 70 to 90 vol % of air.

Advantageous Effect

According to the exemplary embodiments of the present invention, the adhesive coating layer itself improves oil resistance, close contacting properties, corrosion resistance, and insulation, and improves adherence, scratch resistance, weather resistance, welding resistance, and high temperature oil resistance in bonding of different electrical steel sheets.

According to the exemplary embodiment of the present invention, an electrical steel sheet can be adhered without using a conventional fastening method such as welding, clamping, interlocking, and the like, and thus the magnetic properties of the electrical steel sheet product become more excellent.

MODE FOR INVENTION

Although terms such as first, second, and third are used for describing various parts, components, areas, and/or sections, the present disclosure is not limited thereto. Such terms are used only to distinguish any part, any component, area, layer, or section from the other parts, components, areas, layers, other sections. Thus, a first part, a first component, a first area, a first layer, or a first section which is described below may be mentioned as a second part, a second component, a second area, a second layer, or a second section without departing from the scope of the present disclosure.

Here, terminologies are merely used to describe a specific embodiment, and are not intended to limit the present disclosure. A singular form used herein includes a plural form as long as phrases do not express a clearly opposite meaning. The term "include" used in the specification specifies specific characteristics, areas, essences, steps, operations, elements, and/or ingredients, and does not exclude existence or addition of other characteristics, areas, essences, steps, operations, elements, and/or ingredients.

When it is mentioned that a first component is located "above" or "on" a second component, the first component may be located directly "above" or "on" the second component or a third component may be interposed therebetween. In contrast, when it is mentioned that a first component is located "directly above" a second component, a third component is not interposed therebetween.

Although not otherwise defined, all terms used herein, including technical terms and scientific terms, have the same meanings as those generally understood by those skilled in the art to which the present disclosure pertains. Terms defined in a generally used dictionary are interpreted as having meanings according with related technical documents and currently disclosed contents, and are not to be interpreted as idealized meanings or very formal meanings unless otherwise defined.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Exemplary embodiment of the present invention respectively provide an electrical steel sheet adhesive coating composition, an electrical steel sheet laminate, and a method for manufacturing an electrical steel sheet product.

An electrical steel sheet adhesive coating composition according to an exemplary embodiment of the present invention includes, on the basis of 100 wt % of total solids: 15 to 70 wt % of a first composition containing an organic resin and an organic/inorganic composite in which inorganic nanoparticles are substituted for an organic resin; 20 to 80 wt % of a second composition containing a metal phosphate and phosphoric acid; and 1 to 10 wt % of a coupling agent. The electrical steel sheet adhesive coating composition according to the exemplary embodiment of the present invention can bond (fasten) electrical steel sheets without using conventional fastening methods such as welding, clamping, interlocking, and the like. In addition, the bonding force can be maintained even after a stress relief annealing process. In the exemplary embodiment of the present invention, the electrical steel sheet is a non-oriented or oriented electrical steel sheet, and more particularly, it may be a non-oriented electrical steel sheet.

Hereinafter, each component will be described in detail.

The first composition includes an organic resin, and an organic/inorganic composite in which inorganic nanoparticles are substituted for the organic resin.

The organic resin forms a thermally-bonded layer in thermosetting, and is disposed between electrical steel sheets to apply adherence between the electrical steel sheets. When the thermally-bonded layer does not sufficiently apply adherence between the electrical steel sheets, a plurality of electrical steel sheets that are precisely stacked are misaligned during the process. When the lamination position is shifted, the quality of the final manufactured electrical steel sheet product is adversely affected. Since adherence is assured after the thermosetting by the organic resin, the misalignment of the stacked electrical steel sheets can be prevented.

The organic resin is partially decomposed in a stress relief annealing process, which will be described later, but partially remains thereby applying adherence between the electrical steel sheets. In this case, the organic resin may include an aromatic hydrocarbon. In this case, the aromatic hydrocarbon is not pyrolyzed even at a high temperature, and thus maintains adherence even after the stress relief annealing process.

The organic resin containing aromatic hydrocarbon implies a resin that contains an aromatic hydrocarbon in the main chain and/or side chain. Specifically, the aromatic hydrocarbon may include at least one selected from benzene, toluene, xylene, naphthalene, anthracene, and benzopyrene as a functional group.

Specifically, the organic resin may include at least one selected from an epoxy resin, an ester resin, an acryl-based resin, a styrene resin, a urethane-based resin, and an ethylene resin. In this case, by selecting one or more mixtures among the resins exemplified above, it is possible to improve heat resistance of the thermally-bonded layer and the adhesive layer. That is, the organic resin contributes to improving insulating properties, heat resistance, and surface characteristics of the thermally-bonded layer and the adhesive layer.

The organic resin may have a weight-average molecular weight of 1000 to 100,000 and a number average molecular weight of 1000 to 40,000. When each of the weight-average molecular weight and the number average molecular weight is below the lower limit, properties of the adhesive coating layer, such as curability and strength, may be deteriorated, and when the upper limit is exceeded, phase separation in the organic resin may occur and compatibility with a metal phosphate may be deteriorated. More specifically, the organic resin may have a weight-average molecular weight of 5000 to 30,000.

In addition, a softening point (Tg) of a water soluble resin may be 30 to 150° C., and a solid fraction (contents of solid) may be 10 to 50 wt %. When the softening point (Tg) of the water soluble resin exceeds 120° C., viscosity of the composition becomes too high and thus coating workability may be deteriorated.

The organic resin may be included at 10 to 80 wt % of the first composition. When the amount of the organic resin is too small, adherence of the thermally-bonded layer cannot be sufficiently assured. When the amount of the organic resin is too large, adherence of the adhesive layer cannot be sufficiently assured because the organic resin is partially pyrolyzed during the stress relief annealing process. More specifically, the organic resin may be included at 20 to 70 wt % of the first composition.

The first composition includes an organic/inorganic composite in which inorganic nanoparticles are substituted for an organic resin. As previously described, in the stress relief annealing process, the organic resin is partially pyrolyzed, and thus it is difficult to assure sufficient adherence of the adhesive layer only with the organic resin. In order to provide appropriate adherence of the adhesive layer, an organic/inorganic composite in which inorganic nanoparticles are substituted for an organic resin is included. After the stress relief annealing process, the inorganic nanoparticles provide adherence to the adhesive layer. In addition, precipitation or agglomeration of the metal phosphate can be prevented, and surface characteristics after the stress relief annealing can be excellently exhibited.

In the organic/inorganic compound, the organic resin is the same as the above-described organic resin, so duplicated descriptions will be omitted. The organic resin of the above-stated first composition and the organic resin of the organic/inorganic compound may be the same type. When the inorganic nanoparticles are not replaced with an organic resin, and are added alone, the inorganic nano particles aggregate with each other and dispersion does not occur.

Specifically, the inorganic nanoparticles may include at least one of $SiO_2$, $Al_2O_3$, $TiO_2$, MgO, ZnO, CaO, and $ZrO_2$.

The inorganic nanoparticles may have an average particle size of 5 to 100 nm. When the size of the inorganic nanoparticles is too small, it is difficult to manufacture an organic/inorganic compound, and when it is too large, compatibility may decrease.

The inorganic nanoparticles may be substituted in an amount of 5 to 60 wt % in the organic/inorganic compound. That is, the inorganic nanoparticles at 5 to 60 wt % and the organic resin at 40 to 95 wt % may be included with respect to 100 wt % of the organic/inorganic compound. When the amount of the inorganic nanoparticles is too small, appropriate adherence of the adhesive layer after the stress relief annealing cannot be assured. When the amount of the inorganic nanoparticles is too large, agglomeration of the inorganic nanoparticles may occur.

The organic/inorganic compound at 20 to 90 wt % may be included in the first composition. When the amount of the organic/inorganic nano compound is too small, appropriate adherence of the adhesive layer after the stress relief annealing cannot be assured. In addition, precipitation or agglomeration of the metal phosphate may occur. When the amount of the organic/inorganic compound is too large, the content of the organic resin is relatively reduced such that it is difficult to assure appropriate adherence of the thermally-bonded layer. More specifically, the organic resin at 30 to 80 wt % may be contained in the first composition.

15 to 70 wt % of the first composition may be included on the basis of 100 wt % of the total solids of the electrical steel sheet adhesive coating composition. When the content of the first composition is too small, appropriate adherence of the thermally-bonded layer and the adhesive layer after the stress relief annealing cannot be assured. When the amount of the first composition is too large, the content of the second composition is relatively reduced such that it is difficult to assure appropriate adherence of the adhesive layer. More specifically, the first composition at 20 to 60 wt % may be included.

The second composition includes a metal phosphate and phosphoric acid.

The metal phosphate used in the exemplary embodiment of the present invention may be prepared by using a reaction of phosphoric acid ($H_3PO_4$) and a metal hydroxide ($Mx(OH)y$) or a metal oxide ($MxO$), and specifically, aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), magnesium phosphate monobasic ($Mg(H_3PO_4)_2$), and the like.

The metal phosphate contributes to the adhesive characteristics of the adhesive layer after high temperature adhesion, high temperature oil resistance, and stress relief annealing of the thermally-bonded layer by heat fusion. Since it is included together with the above-described resin containing hydrocarbons and the organic/inorganic compound, the adhesive coating composition becomes an organic/inorganic mixed composition.

As briefly mentioned above, the metal phosphate is represented by a chemical formula of $Mx(H_3PO_4)y$, and a mixture of one or more metal phosphates may be included in the second component.

As briefly mentioned above, the metal phosphate included in the second composition may be prepared by a reaction of a metal hydroxide ($Mx(OH)y$) or metal oxide ($MxO$) and phosphoric acid ($H_3PO_4$).

For example, based on 100 parts by weight of a phosphoric acid aqueous solution containing 85 wt % phosphoric acid ($H_3PO_4$), a metal hydroxide ($Mx(OH)y$) or metal oxide ($MxO$) was respectively added and reacted at 80 to 90° C. for 6 to 10 hours, such that each metal phosphate can be obtained.

In this case, the amount of input of the metal hydroxide ($Mx(OH)y$) or metal oxide ($MxO$) is 1 to 40 parts by weight for aluminum hydroxide ($Al(OH)_3$), 1 to 10 parts by weight for cobalt hydroxide ($Co(OH)_2$), 1 to 15 parts by weight for calcium oxide ($CaO$), 1 to 20 parts by weight parts for zinc oxide ($ZnO$), and 1 to 10 parts by weight for magnesium oxide ($MgO$), respectively, on the basis of 100 parts by weight of the phosphoric acid aqueous solution. When such a range is satisfied, heat resistance and/or adherence can be balanced.

The metal phosphate may be included at 10 to 80 wt % based on 100 wt % of the second composition. When the content of the metal phosphate is too small, adherence of the adhesive layer after stress relief annealing cannot be sufficiently assured. When the content of the metal phosphate is too large, adherence of the adhesive layer may be deteriorated due to agglomeration of the metal phosphate.

The phosphoric acid together with the metal phosphate described above contributes to the adhesive characteristic of the adhesive layer after high temperature adhesion, and high temperature oil resistance and stress relief annealing of the thermally-bonded layer by heat fusion.

Phosphoric acid may be included at 20 to 90 wt % based on 100 wt % of the second composition. When too little of the phosphoric acid is included, it may be difficult to properly secure adherence of the adhesive layer after stress relief annealing. Since phosphoric acid has the property of absorbing moisture, when too much of the phosphoric acid is contained, it can absorb moisture in the adhesive coating composition, thereby causing agglomeration of the adhesive coating composition. Due to this, adherence of the adhesive layer may be deteriorated. More specifically, the phosphoric acid may be included at 30 to 70 wt % based on 100 wt % of the second composition.

The second composition may be included at 20 to 80 wt % based on 100 wt % of total solids of the electrical steel sheet adhesive coating composition. When the content of the second composition is too small, after stress relief annealing, a problem in which adherence of the adhesive layer cannot be sufficiently secured may occur. When the content of the second composition is too large, the content of the first composition is relatively reduced, and it may be difficult to secure sufficient adherence of the thermally-bonded layer and the adhesive layer after and stress relief annealing. Specifically, the second composition may include at 30 to 70 wt %.

The coupling agent contributes to maintaining the balance of heat resistance and/or adhesion of the adhesive layer, and particularly improves adherence after the stress relief annealing process.

Specifically, as the coupling agent, one or more of a silane coupling agent, a titanate coupling agent, and an aluminate coupling agent may be included.

The silane coupling agent may include at least one of dimethyldichlorosilane, methyldichlorosilane, methyltrichlorosilane, phenyltrichlorosilane, trichlorosilane, trimethylchlorosilane, silicon tetrachloride, and vinyl trichlorosilane.

The titanate-based coupling agent may include at least one of titanium trisostearate isopropoxide, isopropyl tri (dioctyl phosphite) titanate, isopropyl trioryl titanate, titanium tris(dodecylbenzenesulfonate) isopropoxide, Isopropyl tri(dioctyl pyrophosphate) titanate, di(dioctyl pyrophosphate) ethylene titanate, and tetraisopropyl di(dioctyl phosphite) titanate.

The aluminate-based coupling agent may include at least one of an aluminum-titanium complex, bis (ethyl aceto acetate) aluminum diisopropyl, bis(acetyl acetoate) aluminum diisopropyl, an aluminum acetate coupling agent, isopropyl ester stearoyloxy aluminum, and isopropyl ester stearoyloxy aluminum.

A coupling agent may be included at 1 to 10 wt % with respect to 100 wt % of the solid content of the adhesive coating composition. When the above-stated range is satisfied, heat resistance and/or adhesion of the adhesive layer can be balanced, and particularly, adherence after the stress relief annealing process can be superbly improved. When the content of the coupling agent is too small, the adherence after the stress relief annealing process may be deteriorated. When the content of the coupling agent is too large, adherence may be deteriorated during heat fusion. More specifically, the coupling agent may be included at 5 to 10 wt %.

In addition to the above-stated components, the electrical steel sheet adhesive coating composition may include a solvent to facilitate application and uniformly disperse the components. The above-stated expression of solid content refers to the remaining solid content, except for a volatile matter including a solvent.

The electrical steel sheet laminate according to the exemplary embodiment of the present invention includes a plurality of electrical steel sheets, and a thermally-bonded layer disposed between the plurality of electrical steel sheets. In this case, the thermally-bonded layer means a layer that is formed by forming an adhesive coating layer by coating and curing the above-stated adhesive coating composition to the electrical steel sheet surface, and laminating the adhesive coating layer and thermally bonding the same. The resin in the adhesive coating composition is cured rather than being decomposed during the thermal bonding process such that adherence is given to the thermally-bonded layer. As described, the thermally-bonded layer assures appropriate adherence, and thus the laminated electrical steel sheet is not misaligned. In the thermal bonding process, volatile components such as a solvent in the adhesive coating composition are removed, and only the solid content remains and thus the thermally-bonded layer has the same components and component ratio as the solid content in the adhesive coating composition. The description of the components of the thermally-bonded layer is the same as the description of the adhesive coating composition, and therefore the duplicated description is omitted.

The thermally-bonded layer may have a thickness of 0.5 to 25 μm. When such a range is satisfied, excellent surface characteristics (e.g., insulation property, corrosion resistance, close contacting property, and the like) of the thermally-bonded layer can be provided.

A method for manufacturing an electrical steel sheet product according to an exemplary embodiment of the present invention includes: preparing an adhesive coating composition; coating the adhesive coating composition to a surface of an electrical steel sheet and curing the same to form an adhesive coating layer; laminating a plurality of electrical steel sheets where the adhesive coating layer is formed, and thermally bonding the same to form a thermally-bonded layer; and forming an adhesive layer by performing stress relief annealing on a thermally-bonded electrical steel sheet laminate.

Hereinafter, each step will be described in detail.

First, an adhesive coating composition is prepared. Since the adhesive coating composition has been described above, no duplicated description will be provided.

Next, the adhesive coating composition is coated to the surface of the electrical steel sheet and then cured such that an adhesive coating layer is formed. This step may be carried out at a temperature range of 200 to 600° C. to cure the adhesive coating composition.

A plurality of electrical steel sheets, in each of which the adhesive coating layer is formed, are thermally bonded such that a thermally-bonded layer is formed. Through the thermal bonding process, resin components in the adhesive coating layer are thermally bonded such that a thermally-bonded layer is formed.

The thermal bonding step may be carried out under conditions of a temperature of 150 to 300° C. and a pressure of 0.5 to 5.0 MPa for 0.1 to 120 minutes. The conditions may be individually satisfied, and two or more conditions may be simultaneously satisfied. As described, it can be densely thermally bonded between electrical steel sheets, without gaps or pores by controlling the temperature, pressure, and time conditions.

The thermal bonding step includes a temperature increase step and a bonding step, and the temperature increase rate of the temperature increase step may be 10° C./min to 1000° C./min.

Next, an adhesive layer is formed by performing a stress relief annealing process on the thermally bonded electrical steel sheet laminate. The stress relief annealing may be carried out at a temperature of 500 to 900° C. for 30 to 180 minutes.

The process for forming the adhesive layer may be performed in a denatured gas or nitrogen ($N_2$) gas atmosphere. Specifically, the denatured gas means a gas containing 10 to 30 vol % of liquefied natural gas (LNG) and 70 to 90 vol % of air. The nitrogen gas atmosphere means an atmosphere containing nitrogen. Specifically, it means a gas containing 100% by volume of nitrogen or less than 90 to 100% by volume of nitrogen and 0 to 10% by volume of hydrogen.

When the electrical steel sheet product is manufactured by the manufacturing method according to the exemplary embodiment of the present invention, the magnetic properties (specifically, iron loss, magnetic flux density, and the like) of the electrical steel sheet itself are improved even after stress relief annealing. In addition, it is excellent in high temperature adhesion and high temperature oil resistance by an adhesive coating layer, and the surface characteristics and adhesion characteristics may not be deteriorated particularly even after stress relief annealing.

Hereinafter, preferable exemplary embodiments of the present invention, comparative examples compared to the preferable exemplary embodiments, and evaluation examples thereof will be disclosed. However, the exemplary embodiments below are only exemplary embodiments of the present invention, and the present invention is not limited to the exemplary embodiments below.

EXEMPLARY EMBODIMENTS

An adhesive coating composition is shown in Table 1, and the content of nanoparticles substituted for the organic resin is fixed to 10 wt % with respect to solids 100 wt % of the organic resin, and a particle size is 100 nm.

A non-oriented electrical steel sheet (50×50 mm, 0.35 mmt) is prepared as a blank specimen. An adhesive coating solution formed of the components listed in Table 1 is applied on the upper and lower parts of each prepared blank specimen using a bar coater and a roll coater with a certain thickness (approximately 5.0 μm) and cured at 400° C. for 20 seconds, and then slowly cooled in air such that an adhesive coating layer is formed.

After the electrical steel sheet coated with the adhesive coating layer is laminated to a height of 20 mm, it was pressurized with a force of 500 Kgf and thermally bonded at 220° C. for 60 minutes. Stress relief annealing is carried out on an electrical steel sheet acquired at 780° C. and in a 100 vol % nitrogen atmosphere, which are the bonding conditions. Adherence is measured by a shear-plane tensile test for each electrical steel sheet subjected to adherence and stress relief annealing of the thermally bonded electrical steel sheet for each condition.

The detailed evaluation condition is as follows.

Surface characteristic: It is evaluated by comprehensively observing insulation properties, corrosion resistance, and close contacting properties of a coating layer before thermal bonding, formed by each adhesive coating composition. It is represented as "excellent" when insulation properties, corrosion resistance, and close contacting properties are all excellent, "good" when two of them are excellent, "average" when one of them is excellent, and "poor" when all of them are inferior.

Adherence: Adherence before and after stress relief annealing is measured using a device for measuring the tensile force of a laminated sample while being fixed to upper/lower jigs with a constant force and pulling at a constant speed. In this case, the value is measured at the point where the interface with the minimum adherence falls out of the interface of the laminated sample.

The adherence before and after stress relief annealing is evaluated using different criteria. Adherence is represented as "⊚" when adherence measured after thermal bonding and before stress relief annealing is 1.0 MPa or more, "○" when 0.5 MPa or more, "Δ" when 0.2 MPa or over, and "x" when less than 0.1 MPa. Meanwhile, adherence is "⊚" when being measured to be 0.5 MPa or more after stress relief annealing, "○" when being measured to 0.2 MPa or more, "Δ" when being measured to be 0.1 MPa or more, and "x" when being measured to be less than 0.05 MPa.

Magnetic property improvement rate: An iron loss of a motor core before and after stress relief annealing is measured. The iron loss is measured W10/400.

TABLE 1

| | Adhesive coating composition solution | | | | | | | |
|---|---|---|---|---|---|---|---|---|
| | First composition | | | Second composition | | | | |
| | Organic resin | Organic/ inorganic compound | First composition content | Phosphoric acid content | Metal phosphoric acid | Content of second composition | Coupling agent | |
| | Type/content (wt %) | Type/content (wt %) | (wt %) | (wt %) | Type/content (wt %) | (wt %) | Type | Content (wt %) |
| Exemplary Embodiment 1 | Siloxane/30 | TiO$_2$-styrene/70 | 40 | 30 | MAP/70 | 55 | Phenyltrichloro silane | 5 |
| Exemplary Embodiment 2 | Siloxane/20 | TiO$_2$-epoxy/80 | 25 | 80 | MZP/20 | 70 | Trimethylchloro-silane | 5 |
| Exemplary Embodiment 3 | Phenol/20 | SiO$_2$-ethylene/80 | 30 | 50 | MMP/50 | 60 | Vinyltrichloro-silane | 10 |
| Exemplary Embodiment 4 | Phenol/30 | Al$_2$O$_3$-urethane/70 | 40 | 70 | MCP/30 | 55 | Titanium tri-source thearoyl isopropoxide | 5 |
| Exemplary Embodiment 5 | Vinyl/50 | MgO/styrene/50 | 50 | 20 | MZP/80 | 40 | Bis(ethyl acetoacetate) aliminum diisopropyl | 10 |
| Exemplary Embodiment 6 | Urethane/70 | ZnO-acryl/30 | 20 | 60 | MMP/40 | 70 | Methyldichloro silane | 10 |
| Exemplary Embodiment 7 | Urethane/30 | SiO$_2$-styrene/70 | 40 | 90 | MAP/10 | 50 | Dimethyldichloro-silane | 10 |
| Exemplary Embodiment 8 | Epoxy/30 | SiO$_2$-epoxy/70 | 30 | 30 | MAP/70 | 65 | Dimethyldichloro-silane | 5 |
| Exemplary Embodiment 9 | Epoxy/20 | ZnO-ethylene/80 | 50 | 80 | MZP/20 | 40 | Silicon tetrachloride | 10 |
| Exemplary Embodiment 10 | Acryl/20 | SiO$_2$-acryl/80 | 45 | 50 | MMP/50 | 45 | Phenyl-trichlorosilane | 10 |
| Exemplary Embodiment 11 | Acryl/70 | ZnO-ester/30 | 60 | 70 | MCP/30 | 35 | Trimethyl-chlorosilane | 5 |
| Exemplary Embodiment 12 | Ethylene/50 | SiO$_2$-urethane/80 | 15 | 40 | MCoP/40 | 80 | Vinyl-trichlorosilane | 5 |
| Exemplary Embodiment 13 | Ethylene/50 | Al$_2$O$_3$-acryl/50 | 35 | 20 | MZP/80 | 60 | Isopropyl trioyl titanate | 5 |
| Exemplary Embodiment 14 | Styrene/20 | SiO$_2$-urethane/80 | 20 | 90 | MAP/10 | 75 | Acetic aluminum coupling agent | 5 |
| Comparative Example | Epoxy/30 | SiO$_2$-epoxy/70 | 35 | 40 | MAP/60 | 65 | — | — |

MAP = Al (H$_3$PO$_4$)$_2$, MCoP = (Co (H$_3$PO$_4$)$_2$, MCP = Ca (H$_3$PO$_4$)$_2$, MZP = Zn (H$_3$PO$_4$)$_2$, MMP = Mg (H$_3$PO$_4$)$_2$

TABLE 2

| | Bonding core characteristic | | | |
|---|---|---|---|---|
| | Coating layer surface characteristic | Adherence | | Improvement rate of magnetic property (before/stress after relief annealing) |
| | | Thermal bonding | Stress relief annealing | |
| Exemplary Embodiment 1 | ◎ | ○ | ○ | ◎ |
| Exemplary Embodiment 2 | ◎ | ○ | ○ | ◎ |
| Exemplary Embodiment 3 | ◎ | ○ | ○ | ◎ |
| Exemplary Embodiment 4 | ◎ | ○ | ○ | ◎ |
| Exemplary Embodiment 5 | ◎ | ◎ | Δ | ◎ |
| Exemplary Embodiment 6 | ◎ | ○ | ◎ | ◎ |
| Exemplary Embodiment 7 | ◎ | ○ | ○ | ◎ |
| Exemplary Embodiment 8 | ◎ | ○ | ◎ | ◎ |
| Exemplary Embodiment 9 | ◎ | ◎ | Δ | ◎ |
| Exemplary Embodiment 10 | ◎ | ○ | ◎ | ◎ |
| Exemplary Embodiment 11 | ◎ | ◎ | Δ | ◎ |
| Exemplary Embodiment 12 | ◎ | ○ | ○ | ◎ |
| Exemplary Embodiment 13 | ◎ | ○ | ◎ | ◎ |
| Exemplary Embodiment 14 | ◎ | ○ | ◎ | ◎ |

TABLE 2-continued

| | Bonding core characteristic | | | |
|---|---|---|---|---|
| | | Adherence | | Improvement rate of magnetic property |
| | Coating layer surface characteristic | Thermal bonding | Stress relief annealing | (before/stress after relief annealing) |
| Comparative Example | ◎ | ◎ | X | Δ |

As shown in Table 1 and Table 2, for Exemplary Embodiment 1 to Exemplary Embodiment 16 that satisfy all the components and component ratios, it can be confirmed that the surface characteristics, adherence of the thermally-bonded layer and the adhesive layer, and improvement in iron loss have improved adhesion and iron loss improvement rates.

The present disclosure is not limited to the embodiments, and may be implemented in various other forms. It may be understood by those skilled in the art to which the present disclosure pertains that the present disclosure may be implemented in other detailed forms without changing the technical spirit or the essential feature of the present disclosure. Therefore, it should be understood that the above-described embodiments are not restrictive but are illustrative in all aspects.

The invention claimed is:

1. An electrical steel sheet adhesive coating composition comprising, on the basis of 100 wt % of total solids:
   15 to 60 wt % of a first composition containing an organic resin and an organic/inorganic composite in which inorganic nanoparticles are substituted for an organic resin;
   35 to 80 wt % of a second composition containing a metal phosphate and phosphoric acid; and
   5 to 10 wt % of a coupling agent,
   wherein the coupling agent contains at least one selected from the group consisting of a silane-based coupling agent, a titanate-based coupling agent, and an aluminate-based coupling agent,
   wherein the first composition comprises 20 to 70 wt % of the organic resin and 30 to 80 wt % of the organic/inorganic composite on basis of 100 wt % of the first composition,
   wherein the second composition comprises 10 to 80 wt % of the metal phosphate and 20 to 90 wt % of the phosphoric acid on basis of 100 wt % of the second composition,
   wherein the organic resin comprises at least one selected from the group consisting of an epoxy resin, an ester resin, an acryl-based resin, a styrene resin, a urethane-based resin, an ethylene resin, a phenol resin, and a siloxane resin,
   wherein the inorganic nanoparticles comprise at least one selected from the group consisting of $SiO_2$, $Al_2O_3$, $TiO_2$, MgO, ZnO, CaO, and $ZrO_2$,
   wherein the metal phosphate comprises at least one selected from the group consisting of aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$).

2. The electrical steel sheet adhesive coating composition of claim 1, wherein the silane-based coupling agent comprises at least one selected from the group consisting of dimethyldichlorosilane, methyldichlorosilane, methyltrichlorosilane, phenyltrichlorosilane, trichlorosilane, trimethylchlorosilane, silicon tetrachloride, and vinyl trichlorosilane.

3. The electrical steel sheet adhesive coating composition of claim 1, wherein the titanate-based coupling agent comprises at least one selected from the group consisting of titanium trisostearate isopropoxide isopropyl tri(dioctyl phosphite) titanate, isopropyl trioryl titanate, titanium tris (dodecylbenzenesulfonate) isopropoxide, Isopropyl tri(dioctyl pyrophosphate) titanate, di(dioctyl pyrophosphate) ethylene titanate, and tetraisopropyl di(dioctyl phosphite) titanate.

4. The electrical steel sheet adhesive coating composition of claim 1, wherein the aluminate-based coupling agent comprises at least one selected from the group consisting of an aluminum-titanium complex, bis(ethyl aceto acetate) aluminum diisopropyl, bis(acetyl acetoate) aluminum diisopropyl, an aluminum acetate coupling agent and isopropyl ester stearoyloxy aluminum.

5. The electrical steel sheet adhesive coating composition of claim 1, wherein the organic resin comprises at least one selected from the group consisting of benzene, toluene, xylene, naphthalene, anthracene, and benzopyrene as a functional group.

6. The electrical steel sheet adhesive coating composition of claim 1, wherein the organic resin has a weight-average molecular weight of 1000 to 100,000 and a solid fraction of 10 to 50 wt %.

7. The electrical steel sheet adhesive coating composition of claim 1, wherein the inorganic nanoparticles are substituted in an amount of 5 to 60 wt % in the organic/inorganic compound.

8. The electrical steel sheet adhesive coating composition of claim 1, wherein the organic resin comprises the siloxane resin, the urethane-based resin, or the ethylene resin,
   the inorganic nanoparticles comprise at least one selected from the group consisting of $SiO_2$, $Al_2O_3$, $TiO_2$, and ZnO, and
   the metal phosphate comprises at least one selected from the group consisting of aluminum phosphate monobasic ($Al(H_3PO_4)_3$) and zinc phosphate monobasic ($Zn(H_3PO_4)_2$).

9. An electrical steel sheet laminate comprising:
   a plurality of electrical steel sheets; and
   a thermally-bonded layer that is disposed between the plurality of electrical steel sheets,
   wherein the thermally-bonded layer comprises 15 to 60 wt % of a first composition containing an organic resin and an organic/inorganic composite in which inorganic nanoparticles are substituted for an organic resin, 35 to 80 wt % of a second composition containing a metal phosphate and phosphoric acid, and 5 to 10 wt % of a coupling agent,
   wherein the coupling agent contains at least one selected from the group consisting of a silane-based coupling agent, a titanate-based coupling agent, and an aluminate-based coupling agent,
   wherein the first composition comprises 20 to 70 wt % of the organic resin and 30 to 80 wt % of the organic/inorganic composite on basis of 100 wt % of the first composition, wherein the second comprises 10 to 80 wt % of the metal phosphate and 20 to 90 wt % of the phosphoric acid on basis of 100 wt % of the second composition, wherein the organic resin comprises at least one selected from the group consisting of an epoxy resin, an ester resin, an acryl-based resin, a styrene resin, a urethane-based resin, an ethylene resin, a phenol resin, and a siloxane resin, wherein the inorganic nanoparticles comprise at least one selected from the group consisting of $SiO_2$, $Al_2O_3$, $TiO_2$, MgO, ZnO, CaO, and $ZrO_2$, wherein the metal phosphate comprises at least one selected from the group consisting of aluminum phosphate monobasic ($Al(H_3PO_4)_3$), cobalt phosphate monobasic ($Co(H_3PO_4)_2$), calcium phosphate monobasic ($Ca(H_3PO_4)_2$), zinc phosphate monobasic ($Zn(H_3PO_4)_2$), and magnesium phosphate monobasic ($Mg(H_3PO_4)_2$).

10. A manufacturing method of an electrical steel sheet product, comprising:

preparing the adhesive coating composition of claim 1;

coating the adhesive coating composition on a surface of an electrical steel sheet and then curing the same to form an adhesive coating layer;

laminating a plurality of electrical steel sheets where the adhesive coating layer is formed, and thermally bonding the same to form a thermally-bonded layer; and forming an adhesive layer by performing stress relief annealing on a thermally-bonded electrical steel sheet laminate.

11. The manufacturing method of the electrical steel sheet product of claim 10, wherein the forming of the adhesive coating layer is carried out in a temperature range of 200 to 600° C.

12. The manufacturing method of the electrical steel sheet product of claim 10, wherein the forming of the thermally-bonded layer comprises thermal bonding under conditions of a temperature of 150 to 300° C. and a pressure of 0.5 to 5.0 MPa for 0.1 to 120 minutes.

13. The manufacturing method of the electrical steel sheet product of claim 10, wherein the forming the thermally-bonded layer comprises a temperature increase step and a bonding step, and the temperature increase rate of the temperature increase step is 10° C./min to 1000° C./min.

14. The manufacturing method of the electrical steel sheet product of claim 10, wherein the forming of the adhesive layer is carried out at a temperature of 500 to 900° ° C. for 30 to 180 minutes.

15. The manufacturing method of the electrical steel sheet product of claim 10, wherein the forming of the adhesive layer is carried out in a denatured gas or nitrogen N2 gas atmosphere.

16. The manufacturing method of the electrical steel sheet product of claim 10, wherein the forming of the adhesive layer is carried out in a denatured gas atmosphere that includes a gas containing 10 to 30 vol % of liquefied natural gas (LNG) and 70 to 90 vol % of air.

* * * * *